Sept. 9, 1969  J. S. BAER  3,465,857
CLUTCH AND ACTUATOR SYSTEM
Filed April 9, 1968
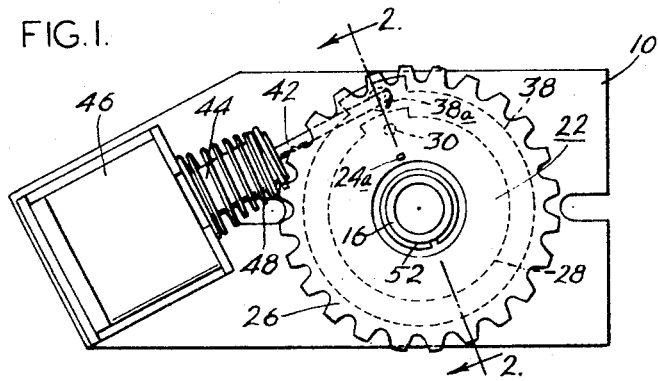
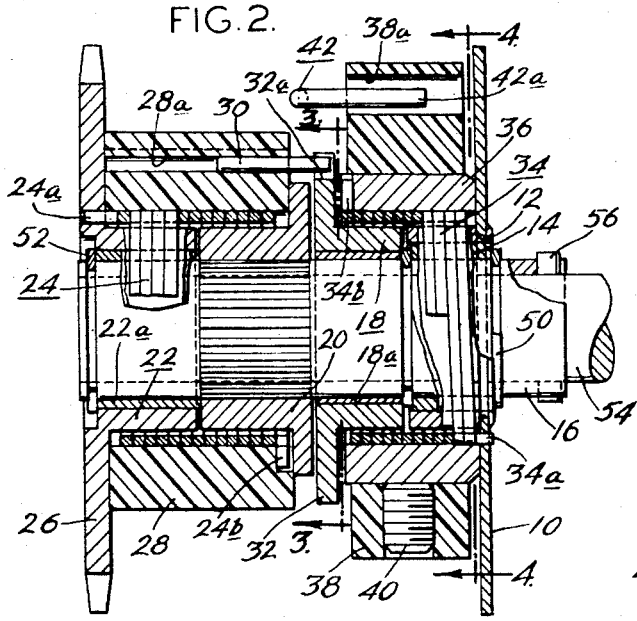
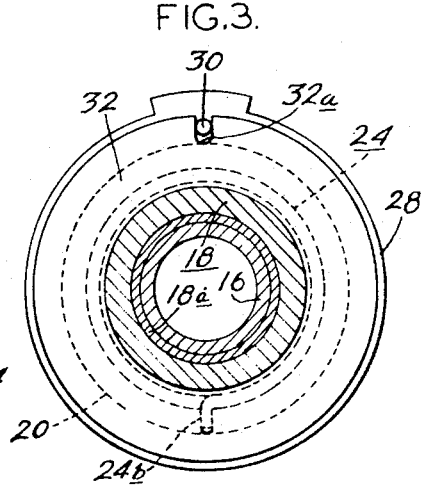
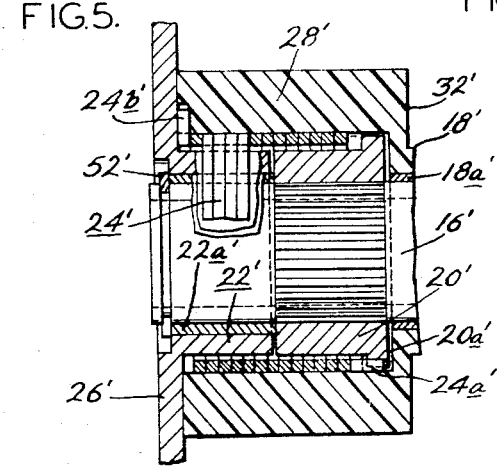
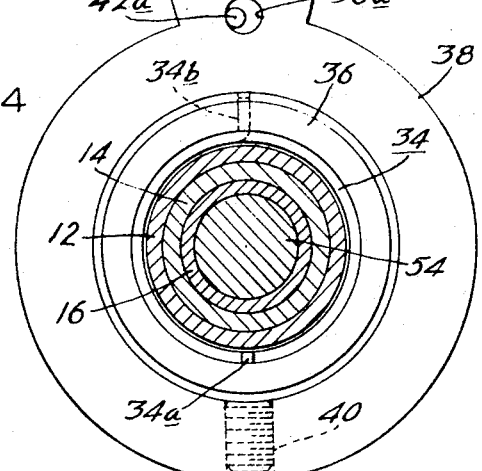
INVENTOR:
JOHN S. BAER
BY Howson & Howson
ATTYS

United States Patent Office 3,465,857
Patented Sept. 9, 1969

3,465,857
CLUTCH AND ACTUATOR SYSTEM
John S. Baer, Medford Lakes, N.J., assignor to Precision Specialties, Inc., Huffville, Pitman, N.J.
Filed Apr. 9, 1968, Ser. No. 719,917
Int. Cl. F16d *13/04, 41/20, 43/00*
U.S. Cl. 192—36                                      14 Claims

ABSTRACT OF THE DISCLOSURE

A clutch having a helical drag spring to impede rotation of a clutch control member to which one end of a helical clutch spring is affixed. The other end of the normally disengaged clutch spring is fixed to the input hub so that the clutch spring and clutch control member normally rotate with the input hub. When the rotation of the clutch control member is impeded by the helical drag spring, the helical clutch spring tends to wrap down on the input and output hubs so that the output hub is driven by the input hub through the clutch spring.

---

The present invention relates to a bidirectional overrunning clutch and actuator system. More specifically the present invention relates to a clutch of the helical spring type which is normally disengaged and an associated drag mechanism which is selectively applied to engage the clutch and cause it to engage.

The present invention relates to the class of clutch which employs a frictional drag to impede rotation of a clutch control member to which one end of a helical clutch spring is affixed. The other end of the normally disengaged clutch spring is fixed to the input hub so that the clutch spring and clutch control collar normally rotate with the input hub. When the rotation of the clutch control member is impeded the helical spring tends to wrap down on the input and output hubs so that the output hub is driven by the input hub through the clutch spring.

In the prior art rotation of the clutch control member in this type of clutch has been impeded by various means. For example a brake element arranged to bear against the clutch control member, which is usually an annular collar, has been commonly employed.

The present invention provides a novel way of applying a drag to the clutch control collar, which has advantages in permitting greater uniformity and repeatability of performance and which may be provided readily for adjustment in the event of wear.

In accordance with the present invention the clutch control member is mechanically affixed to a drag hub which rotates with the clutch control member. The drag hub is surrounded by a helical drag spring of opposite hand from the clutch spring. One end of the drag spring is affixed to a reference frame relative to which the clutch hubs rotate. The other end of the drag spring is connected to a drag control member, preferably a collar surrounding the drag spring. A limited rotation of the drag control member, as by the actuator, will cause the drag spring to engage and impede, but not stop the rotation of the drag hub and hence the clutch control member to which it is affixed. This drag will, in turn, cause the clutch spring to engage the clutch input and output hubs. The drag spring being of opposite hand from the clutch spring causes it to tend to open up, instead of tightening down on the braking and drag hubs.

The clutch so described is a bidirectional overriding clutch in that the input is free to rotate in either direction when the clutch is disengaged. The clutch will engage only when rotation is in that direction which causes drag on its clutch control member to cause the clutch spring to wrap down upon the output hub, however.

In the clutch so described the input and output hubs may be interchanged simply by changing the spring connection from one between the former input hub and clutch control member to one between the former output hub, which becomes the input hub, and the control collar. If this is done the direction of rotation for actuation will be the opposite direction when the same hand of clutch spring is employed. If the hand of the clutch spring is changed to keep the direction of actuation the same, as before the input and output were interchanged, the hand of the drag spring will, of course, also have to be reversed.

More specifically, in accordance with the present invention, a spring clutch is employed having input and output hubs rotatably supported relative to a frame with the input hub connectable to a suitable drive means. A helical clutch spring is arranged generally coaxially with, but normally out of engagement with the cylindrical clutch surfaces of the input and output hubs. One end of the spring is affixed to the input hub and the other end of the spring is affixed to a clutch control member which, when subjected to drag opposing rotation imposed by the input hub, wraps the clutch spring down against at least the output hub, causing the input to drive the output hub. The hand of the clutch spring is selected so as to cause the clutch spring to tend to wrap tighter due to the direction of rotation of the output hub. A rotatable drag hub rotatable relative to the frame and coupled to the clutch control member to rotate with said clutch control member has at least one cylindrical surface coaxial with the input and output hubs and rotatable about their common axis. A helical drag spring of opposite hand from the clutch spring surrounds at least part of the drag hub, is affixed at one end to the frame. The drag spring is normally out of engagement with the cylindrical hub surface of the rotatable drag hub. A drag control member affixed to the other end of the drag spring to allow the drag spring to wrap down into contact with the cylindrical drag hub surface when the drag control member is rotated. This action imposes a drag upon the drag hub and therefore upon the clutch control member to which it is affixed to actuate the clutch.

For a better understanding of the present invention, reference is made to the following drawings in which:

FIG. 1 is a side elevational view of a clutch and actuator system of the present invention;

FIG. 2 is a sectional view along line 2—2 of FIG. 1 with the clutch and drag springs partially in elevation;

FIG. 3 is a sectional view taken along line 3—3 in FIG. 2;

FIG. 4 is a sectional view taken along line 4—4 in FIG. 2; and

FIG. 5 is a detailed sectional partial view showing a modification of the structure of FIGS. 1–4 in which the input and output hubs have been interchanged.

A preferred embodiment of the bidirectional overriding clutch and actuator system of the present invention is shown in FIGS. 1 to 4. The structure as a whole takes its reference to the machine or structure with which it is to be associated as a clutch by means of a frame which is fixed relative to that machine or structure. The frame here is a mounting or ground plate 10 which is fixed to the structure in which the clutch is employed and relative to which the rotatable structure of the system moves. A tubular frame hub 12 is fixed to the frame 10 and provided with an inner bearing sleeve 14 which, in turn, snugly contains a hollow tubular rotatable shaft 16. The balance of the rotatable structure is assembled along the rotatable shaft.

The nature of the reference frame 10 and its relationship to the tubular rotatable shaft 16 is described in greater detail in my United States Patent No. 3,373,851.

The rotatable structure, proceeding outwardly from the frame 10 and the frame hub 12, are drag hub 18, clutch output hub 20 and clutch input hub 22. Drag hub 18 and input hub 22 are rotatable relative to the shaft and provided with inner bearing sleeves 18a and 22a which provide a bearing fit with shaft 16, whereas output hub 20 is press fitted onto a splined outer area of shaft 16 and therefore rotates with and mechanically acts as a part of shaft 16 at all times.

Input hub 22 and output hub 20 provide cylindrical clutch faces at their outer surfaces into which surrounding helical clutch spring 24 is moved in order to engage the clutch. The spring 24 as seen in FIG. 2 is a left-hand spring. One end of the spring is fixed to the input hub 22 by means of end tang 24a which extends parallel to the spring's helical axis. Tang 24a is a hole in an integral radial flange 26 of input hub 22 which flange provides a sprocket wheel for engaging a chain or similar input drive means. Of course other conventional input drive means may be substituted for the sprocket wheel 26. The other end of clutch spring 24 is bent into an outwardly extending radial tang 24b which is engaged in a radial groove in annular collar 28, which provides a clutch control member. The spring 24 is normally disengaged from the clutch surfaces of output hub 20 and input hub 22 so that the clutch is normally disengaged. Spring 24 may advantageously be made to rest against the inner diameter of collar 28.

Clutch control collar 28 is, in turn, mechanically connected to drag hub 18 by pin 30 which is snugly supported within bore 28a in collar 28. The pin is snugly retained by and moves with the collar 28 at all times. The pin also engages a groove 32a in the periphery of flange 32 of drag hub 18. Groove 32a snugly accommodates pin 30 so that as clutch collar 28 rotates with input hub 22 by virtue of connection through clutch spring 24, drag collar 18 also rotates by virtue of the mechanical connection to collar 28 through pin 30 and flange 32.

Surrounding the outer clutch faces of drag hub 18 and frame hub 12 is a helical drag spring 34 of right-hand. In any embodiment of the present invention drag spring 34 is opposite hand from the clutch spring 24. Drag spring 34 is provided with an axial tang 34a at one end which engages an axial slot in the frame plate 10. At its other end it is provided with a radial tang 34b which engages a radial slot in drag collar 36. Drag collar 36 is preferably provided with an outer actuator ring 38 which is made rotationally adjustable around the outer periphery of the drag collar 36 by loosening set screw 40, which extends through the actuator ring and into contact with the drag collar 36. When the selected position is found the set screw 40 is tightened and the actuator ring 38 becomes an integral part of the drag hub 36 and rotates with it. The actuator ring 38 is provided with an enlarged hole 38a which extends into an outwardly extending ridge on the periphery of the actuator ring. Extending into the enlarged hole 38a is a transverse portion 42a of an L-shaped actuator rod 42. The main shank of rod 42 is connected to the magnetic core 44 of a solenoid whose winding 46 is mounted on the frame plate 10. The solenoid may be energized, for example, by a suitable source of power as by the closing a switch in series with the winding 46 and a source of power. When energized, the core 44 is drawn into the solenoid winding 46 against the action of the spring 48. Upon the de-energization of the solenoid the spring 48 urges the magnetic core plunger 44 outward. This reciprocal movement of core 44 is transmitted by actuator rod 42 to actuator ring 38 and constitutes the means of controlling operation of the clutch.

Assembly may be accomplished in a variety of ways.

The drag spring 34 may be assembled to the pre-assembled drag collar 36 and actuator ring 38 and the spring 34 then assembled over the frame hub with the tang 34b fitted into frame plate 10. The solenoid structure may be assembled to the frame plate 10 and to actuator ring 38. The shaft may then be placed in position through the frame hub and within the drag spring 34 after the drag hub 18 is slid onto the shaft into fixed output hub 20. The snap ring 50 may be put in place to hold the shaft and assembly to the frame plate. Clutch spring 24 may be assembled to clutch control collar 28 with its tang 24b in proper position and then placed over input hub 22 and tang 24a inserted into its slot. This assembly may then be slid over the end of shaft 16 until input hub 22 is against output hub 20 and a snap ring 52 may then be put in position around the tubular shaft 16 to hold the assembly together. The tubular shaft 16 serves as an output connection in the structure described and may be connected to an output shaft 54 by a pin 56, or by any other suitable conventional means.

In operation, it will be observed that the clutch is normally disengaged. In this condition the input hub 22 and the input drive sprocket 26 may be rotated freely in either direction. Similarly when the clutch is disengaged the output hub 20, the hollow shaft 16 to which it is attached and the output shaft 54 may be rotated in either direction. As the drive sprocket 26 and input hub 22 rotate, the clutch collar 28 connected to the input through clutch spring 24 will rotate with the input. Similarly the drag hub 18 connected to the clutch collar through pin 30 will rotate with the input.

The clutch can be engaged when the input is running in such direction that imposing a drag on drag collar 18 causes the clutch collar to lag behind the input hub 22 so that clutch spring 24 wraps down on the cylindrical clutch surfaces of input hub 22 and output hub 20. When this happens the output hub will be driven in the same direction as the input hub. The rotation is in such direction that the drive at the input tends to cause the clutch spring to wrap more tightly about the output hub.

Drag is imposed upon the drag hub when the solenoid winding 46 is energized thereby causing the actuator 38 and the drag collar 36 to be rotated in such direction as to close the helical spring 34 down on the frame hub 12 as well as the drag hub 18. The hand of the drag spring is such that when it is wrapped down on the drag hub the rotation of the drag hub relative to the frame will tend to loosen rather then cause the spring 34 to clamp down tighter on the drag hub 18. Thus, instead of imposing a braking force which would stop the drag hub 18, the effect imposed is a drag which impedes rotation of hub 18 but does not stop it. The impeding of hub 18 acts to impede clutch control member 28 which in turn causes clutch spring 24 to wrap down as previously described to actuate the clutch.

The set screw 40 permits relative adjustment between actuator 38 and drag control member 36 to make certain that the movement produced by the solenoid 46 through plunger 44 and rod 42 is sufficient to cause the drag spring 34 to move against the drag hub 18 and be effective to actuate the clutch. The enlarged hole 38a is provided to permit the pull by the solenoid to be accommodated without the sudden pull which would be experienced by a more closely coupled mechanical structure.

It should be pointed out in passing that although the embodiments shown and described herein show the preferred form in which both input and output hubs are provided with cylindrical clutch faces against which the clutch spring 24 is wrapped it is possible to produce the same kind of action with a clutch spring which wraps down against only a cylindrical surface on the output hub. Similarly it will be apparent that no frame hub need be provided since drag springs 34 is already attached to the frame and it is essential only that drag spring 34 contacts drag hub 18 in order to provide the required drag to actuate the clutch.

The clutch of the present invention permits the input and output hubs to be interchanged by simply interchanging the clutch spring attachment from input to output hub, which, by definition, interchanges these hubs. Also the clutch control member may be integral with the drag hub. Both of these modifications are shown in FIG. 5.

In FIG. 5 parts corresponding to those FIGS. 1–4 are given the given number designators with the addition of a prime thereto. FIG. 5 is a partial view since the rest of the structure not illustrated is the same as that shown in FIGS. 1–4.

In FIG. 5 clutch control member 28' is made integral with the rotatable drag hub 18' by joining its radial flange 32' to collar 28'. This change in structure will of course produce no change in operation from the structure of FIGS. 1–4.

The interchange of input and output hubs will, of course, produce a change in the sense that the input becomes the shaft 54 through tubular shaft 16' to which the input hub 20' is fixed. By the same token output is taken through the sprocket wheel 26' which is attached to output hub 22'. In order to permit the clutch spring 24' to be connected between the input hub and the clutch control member 28', the radially outwardly extending tang 24b is placed at the opposite end of the spring 24' to engage a radial slot in clutch control collar 28'. Tang 24a parallel to the axis is engaged in a slot in a radially outward extending flange 20a' on input hub 20'.

Operation remains essentially the same in the embodiment of FIG. 4 with the clutch control member 28' rotating with the input hub 20' by virtue of connection through spring 24' and drag hub 18' rotating with clutch control member 28'. When the rotation of drag hub 18' is impeded by drag spring 34, exactly as in the FIGS. 1–4 arrangement, the clutch control collar 28' will cause the spring 24' to wrap down upon the output hub 22' and thereby drive the output hub through the output sprocket 26'.

If in making the interchange of the output and input hubs a spring of the same hand is retained no change needs to be made at all in the drag spring. On the other hand, if the hand of the clutch springs 24' is changed, the hand of the drag spring 34 will also have to be changed since the hands of these two springs must be opposite in order for them to accomplish their desired functions.

From the foregoing it will be clear to those skilled in the art that an easily interchanged input and output can be achieved with the clutch of the present invention. It will also be apparent that until the clutch is engaged both input and output are free to rotate in either direction.

Various modifications of the present invention have been shown and suggested. Other modifications within the scope of the claims will occur to those skilled in the art. All such modifications are intended to be within the scope and spirit of the present invention.

I claim:
1. A clutch and actuator system comprising:
   a frame,
   an input hub rotatably supported relative to the frame, connectable to suitable drive means,
   an axially aligned output hub rotatably supported relative to the frame, connectable to driven apparatus and provided with a cylindrical clutch surface coaxial with and adjacent to the input hub,
   a helical clutch spring generally coaxial with but normally out of engagement with the clutch surface of the output hub, one end of said spring being affixed to the input hub,
   a clutch control member affixed to the other end of the clutch spring and acting when subjected to drag opposed to rotation imposed by the input hub to wrap the clutch spring down against at least the output hub, the hand of the clutch spring being selected so as to cause the clutch spring to wrap tighter as the result of driving the output hub,
   a rotatable drag hub rotatable relative to the frame and coupled to the clutch control member to rotate with said clutch control member and having a cylindrical surface, coaxial with said input and output hubs and rotatable about their common axes,
   a helical drag spring of opposite hand from the clutch spring surrounding at least part of the rotatable drag hub, affixed at one end to the frame, and normally out of engagement with the cylindrical surface of the rotatable drag hub, and
   a drag control member movable relative to the frame, affixed to the other end of the drag spring, and adapted to be moved to cause the drag spring to wrap down into contact with said cylindrical hub surface and impede, but not stop, rotation of the drag hub, the spring being of such hand that the rotation of the rotatable hub thereby imposing the drag needed to actuate the clutch.

2. The clutch and actuator system of claim 1 in which the input hub is also provided with a cylindrical clutch surface coaxial with the axis of rotation of the input hub and the clutch spring when wrapped down engages both input and output hub cylindrical clutch surfaces.

3. The clutch and actuator system of claim 2 in which the frame is provided with a hub coaxial with the axis of rotation of the drag hub and adjacent to the cylindrical surface of the drag hub and the drag spring when wrapped down engages the cylindrical surfaces of both the rotatable drag hub and the frame hub.

4. The clutch and actuator system of claim 1 in which the clutch control member is a collar closely surrounding the clutch spring in its unwrapped condition.

5. The clutch and actuator system of claim 4 in which the drag collar is a coaxial two piece structure the pieces of which are normally fixed together but which are capable of manual adjustment by relative rotation enabling adjustment of the point at which the clutch is actuated.

6. The clutch and actuator structure of claim 5 in which the drag control member is a collar closely surrounding the drag spring in its unwrapped condition.

7. The clutch and actuator system of claim 1 in which the drag control member affixed to the other end of the drag spring includes a drag collar and means to move the drag collar sufficiently to cause the spring to engage the drag hub.

8. The clutch and actuator system of claim 7 in which means producing relative movement is electro-mechanical motor means affixed to the frame and acting on the drag collar.

9. The clutch and actuator system of claim 8 in which the electro-mechanical motor means is a solenoid whose winding is affixed to frame and whose core is attached to suitable linkage for moving the collar.

10. The clutch and actuator system of claim 1 in which the respective hubs are mounted side-by-side on a common shaft which permits relative rotation of at least all but one hub.

11. The clutch and actuator system of claim 10 in which one of the clutch hubs is located between two other hubs and connected to the common shaft which permits connection to one of said other hubs.

12. The clutch and actuator system of claim 11 in which the hub connected to the common shaft is the output hub which is located between the input and the drag hub.

13. The clutch and actuator system of claim 1 in which one of the clutch hubs is provided with driving means integral with the hub.

14. The clutch and actuator system of claim 13 in which the input hub is the hub provided with driving means integral with the hub.

References Cited

UNITED STATES PATENTS

| | | | |
|---|---|---|---|
| 2,140,975 | 12/1938 | Welch | 192—35 XR |
| 2,577,181 | 12/1951 | Christensen | 192—36 XR |
| 2,751,773 | 6/1956 | Woodson. | |
| 3,373,851 | 3/1968 | Baer | 192—81 XR |

CARLTON R. CROYLE, Primary Examiner

A. D. HERRMANN, Assistant Examiner

U.S. Cl. X.R.

192—41, 81